May 19, 1959
B. L. BANFILL
2,886,892
ELECTRICAL CALIPER DEVICE
Filed Feb. 24, 1956
2 Sheets—Sheet 1
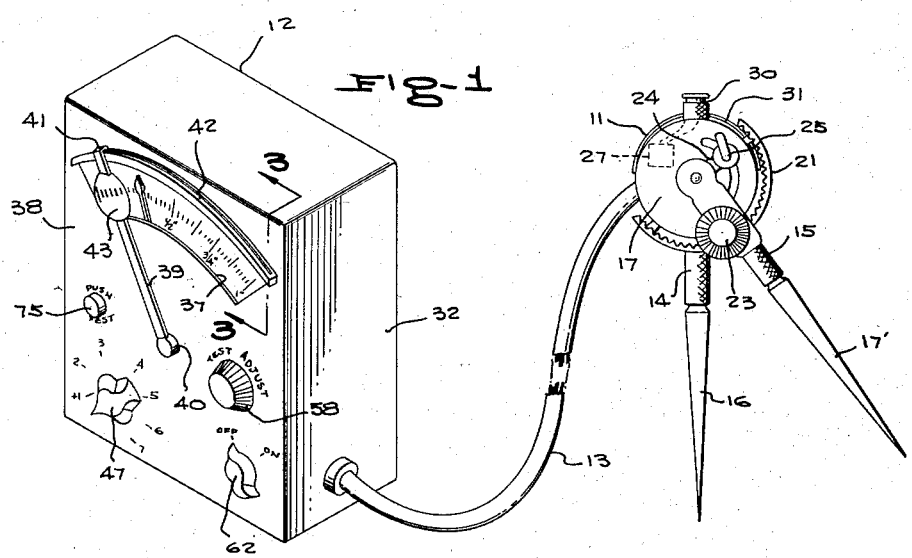
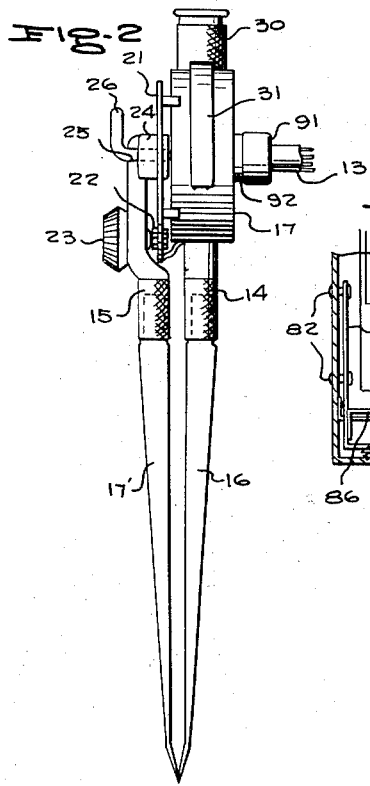
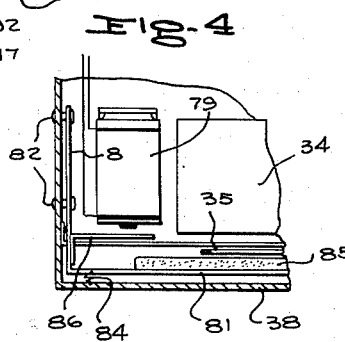
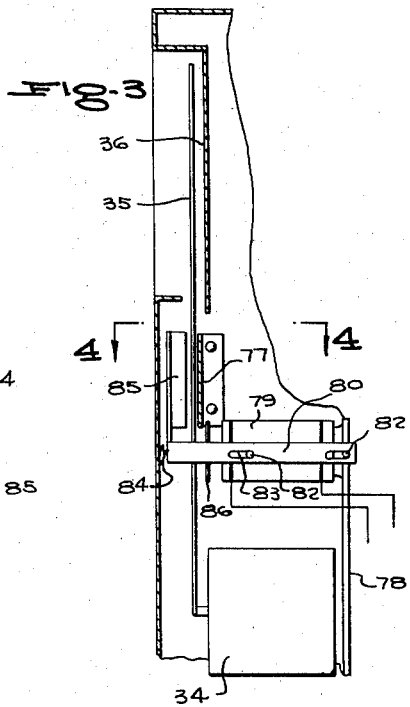
INVENTOR.
BILL L. BANFILL
BY
McMorrow, Berman & Davidson
ATTORNEYS

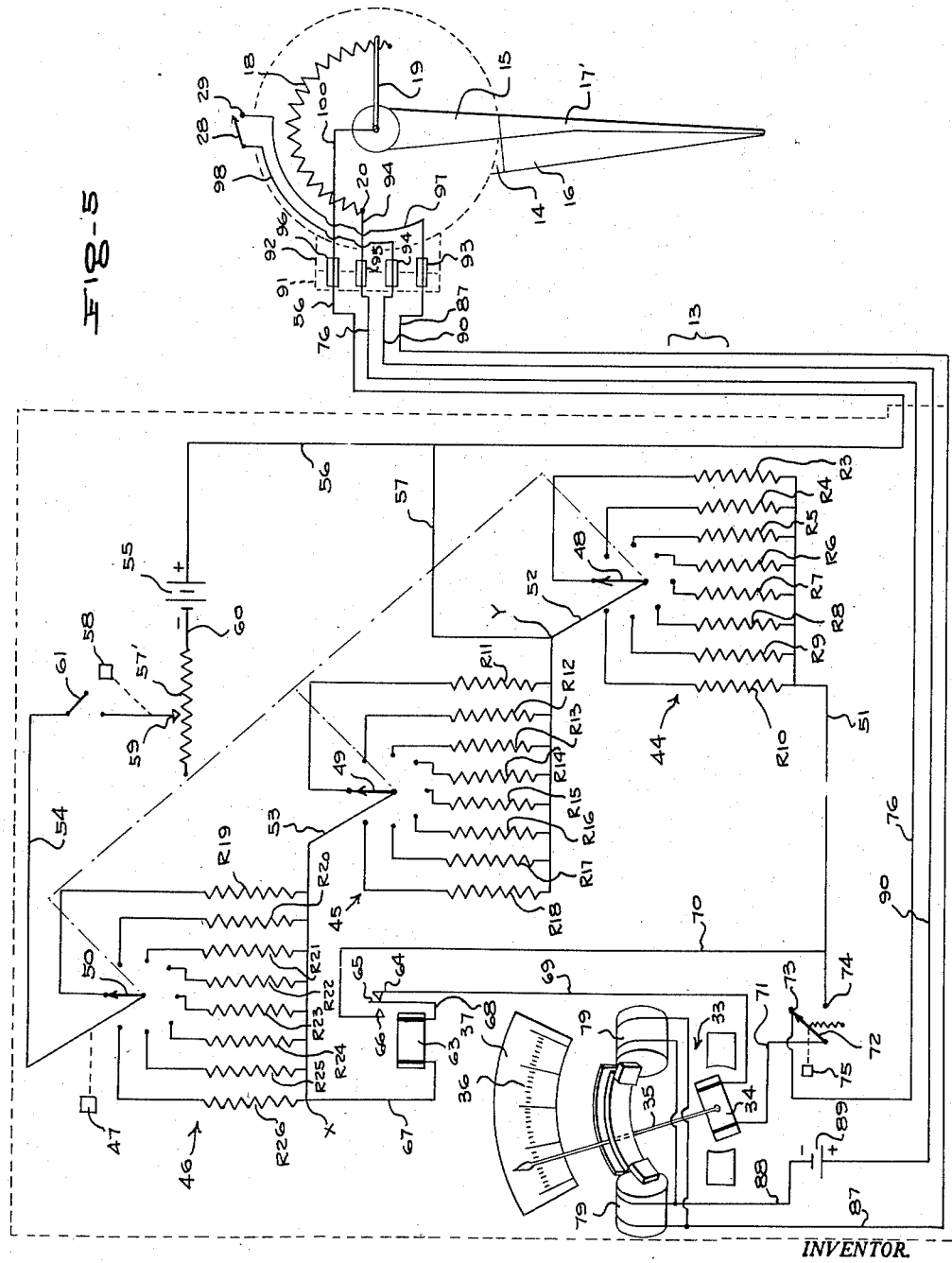

United States Patent Office 2,886,892
Patented May 19, 1959

2,886,892

ELECTRICAL CALIPER DEVICE

Bill L. Banfill, Healy Fork, Alaska

Application February 24, 1956, Serial No. 567,605

1 Claim. (Cl. 33—148)

This invention relates to electrical measuring devices, and more particularly to an improved electrical caliper device of the type having a pair of pivotally connected arms and having electrical indicating means providing readings in accordance with the separation of said arms.

The main object of the invention is to provide a novel and improved electrical caliper device which is simple in construction, which is easy to use, and which provides accurate readings.

A further object of the invention is to provide an improved electrical caliper device which involves relatively inexpensive components, which is rugged in construction, which may be employed for a wide range of applications by the use of suitable accessory tips, and which is arranged so that if so desired, it may be employed as an ordinary mechanical caliper by detaching the electrical components thereof.

A still further object of the invention is to provide an improved electrical caliper device of the type having a pair of pivotally connected work-engaging arms and electrical indicating means providing readings in accordance with the separation of said arms, the device being compact in size, being light in weight, and being easy to adjust for a required measurement.

Further objects and advantages of the invention will become apparent from the following description and claims, and from the accompanying drawings, wherein:

Figure 1 is a perspective view of an electrical caliper device according to the present invention.

Figure 2 is an enlarged side elevational view of the mechanical portion of the caliper device of Figure 1, showing the caliper head and the arms connected thereto.

Figure 3 is an enlarged vertical cross sectional detail view taken on the line 3—3 of Figure 1.

Figure 4 is a fragmentary horizontal cross sectional view taken on the line 4—4 of Figure 3.

Figure 5 is a schematic diagram illustrating the electrical circuit employed in the caliper device of Figures 1 to 4.

Referring to the drawings, the improved caliper device comprises a mechanical portion 11 and an indicating and adjusting portion 12 which is connected to the mechanical portion 11 by a multiple conductor cable 13, as illustrated in Figure 1.

The mechanical portion 11 comprises a pair of arms 14 and 15 to which are threadedly connected respective caliper tips 16 and 17', the arm 14 being rigidly connected to a generally circular housing 17 and projecting radially from the wall thereof. The housing 17 has mounted therein a resistance winding 18 (Figure 5) which is slidably engaged by a contact arm 19 rigidly secured to an axial shaft element rotatably supported in the wall of the housing 17 and rigidly secured, externally of the housing, to the caliper arm 15.

The resistance winding 18 is suitably tapered with respect to its electrical resistance value, so that the resistance value between the contact arm 19 and an end terminal 20 will vary in direct proportion to the spacing between the ends of the tips 16 and 17' attached to the respective caliper arms 14 and 15.

Designated at 21 is an arcuate rack member which is rigidly secured to the housing 17 coaxially therewith and extending between the caliper arm 15 and the housing 17, as shown in Figure 2. Rotatably mounted on the caliper arm 15 is a pinion gear 22 meshing with the gear teeth of the arcuate rack member 21, the gear being carried on a suitable shaft journaled in the arm 15 and provided on its outer end with a knob 23, whereby the gear 22 may be manually rotated to adjust the position of the caliper arm 15 with respect to the caliper arm 14.

Rigidly secured to the top end portion of the caliper arm 15, as viewed in Figure 2, is a laterally extending arm 24 in which is threadedly engaged a clamping screw 25, the inner end of said clamping screw being clampingly engageable with the wall surface of the housing 17 when the screw is tightened to lock caliper arm 15 in a fixed position with respect to caliper arm 14. The screw 25 is provided with the operating lever 26 for rotating the screw when required.

Suitably mounted inside the housing 17 is a conventional relay device 27 controlling a pair of contacts 28 and 29 (see Figure 5) and operated by a push button switch 30 slidably mounted on an arcuate resilient supporting bar 31 secured at its opposite ends to the periphery of the housing 17. The wires connecting the push button switch 30 to the relay device 27 extend through a suitable slot, not shown, in the periphery of the housing 17, whereby the push button switch 30 may be shifted in position on the resilient supporting track 31, so as to be readily operated in different positions of separation of the caliper arms 14 and 15. The relay device 27 comprises a conventional arrangement whereby the relay contacts 28 and 29 will be closed when the push button switch 30 is actuated and will remain closed until the push button switch 30 is again actuated. The relay device 27 is conventional per se and is well known in the art.

The portion 12 of the caliper device comprises a suitable housing 32 in which is mounted a milliammeter having a movable coil 34 to which is connected an indicating needle 35, the indicating needle 35 being disposed adjacent an arcuate scale 36 which is visible through an arcuate window 37 provided in the outer wall 38 of housing 32. Designated at 39 is an arm pivoted at 40 to said outer wall on the same axis as the meter coil 34, the arm 39 being provided at its upper end with a hook-like lug 41 slidably engaged with an arcuate guide member 42 secured to the outer wall 38 of housing 32 at the top margin of the arcuate window 37. The arm 39 is provided with a lens 43 at the portion thereof overlying the window 37, whereby the arm 39 may be manually adjusted, when desired, to a position wherein the lens 43 overlies the indicating needle 35 of ammeter 33, to facilitate reading the meter scale 36.

Mounted in the housing 32 are three sets of calibrating resistors, designated generally at 44, 45 and 46. Also mounted in the housing 32 is a three-section wafer switch having a common operating shaft which extends through the wall 38 of housing 32 and which is provided on its outer end with a pointer knob 47. The respective poles of the three-wafer switch are designated at 48, 49, and 50 in Figure 5.

The group of calibrating resistors 44 comprises eight resistors, designated specifically at $R_3$ to $R_{10}$, each of said resistors having one terminal thereof connected to a common wire 51 and having its opposite terminal connected to a respective stationary contact engageable by the switch pole 48, as shown in Figure 5. The resistors $R_3$ through $R_{10}$ are of different values, whereby the combination of the group of resistors 44 and the switch section including the switch pole 48 constitutes a variable resistor connected between wire 51 and a wire 52, which is connected to the switch arm 48 in Figure 5.

The group of resistors 45 comprises respective resistors $R_{11}$ to $R_{18}$ of respective different values having one terminal thereof connected to the common wire 52 and having their opposite terminals connected to the respective stationary contacts engageable by the switch pole 49, whereby the group of resistors 45 in combination with the switch section associated with the pole 49 defines a variable resistance connected between wire 52 and a wire 53, connected to the switch arm 49.

The group of resistors 46 comprises respective fixed resistors $R_{19}$ to $R_{26}$, each having one terminal thereof connected to the wire 53 and having the opposite terminal thereof connected to one of the stationary contacts associated with the switch pole 50, whereby the group of resistors combined with the switch section including the switch pole 50 defines a variable resistance connected between wire 53 and a wire 54 connected to the switch pole 50.

Since the switch arms 48, 49 and 50 are movable in unison, being connected to the same shaft, the respective variable resistors above defined are thus mechanically ganged for simultaneous adjustment.

Designated at 55 is a battery which is mounted in the housing 32 and to the positive terminal of which is connected a wire 56. The wire 52 is connected to the wire 56 by a wire 57, as shown. Mounted on the wall 38 of housing 32 is an adjusting resistor 57' provided with the external operating knob 58 controlling the position of the sliding contact 59 of the resistor 57'. The negative terminal of battery 55 is connected by a wire 60 to one terminal of resistor 57'. The movable contact 59 of resistor 57' is connected to wire 54 through a manually operated switch 61 having the external control knob 62.

The milliammeter 33 is provided with a protective relay 63 having a stationary contact 64 normally engaged by an armature 65 and having another stationary contact 66 disposed opposite the contact 64. The winding of the relay 63 is connected in series with the meter winding 34 through the contacts 64, 65, so as to normally receive the same current as the meter coil 34. When the current exceeds a predetermined limiting value, the armature 65 disengages from the contact 64 and engages the contact 66.

As shown, one terminal of the protective relay 63 is connected by a wire 67 to the wire 53. The other terminal of the winding of relay 63 is connected by a wire 68 to armature 65. Contact 64 is connected by a wire 69 to one terminal of the meter coil 34, and the contact 66 is connected by a wire 70 to the wire 51. The remaining terminal of the meter coil 34 is connected by a wire 71 to the pole 72 of a two-position switch having the respective stationary contacts 73 and 74. The pole 72 is normally biased into engagement with the contact 73 but may be moved away from contact 73 into engagement with the contact 74 by exerting force on a suitable push button element, shown at 75 in Figure 1, mounted on the front wall 38 of the housing 32. Thus, when the push button 75 is pressed inwardly, the coil 34 is disconnected from the contact 73 and is connected to the contact 74 through the switch arm 72 and the wire 71.

Contact 73 is connected to a wire 76 forming part of the cable 13. Wire 56 also forms part of said cable.

The milliammeter 33 is provided with means for locking the needle 35 in a given position thereof at times, comprising a smooth arcuate plate member 77 of non-magnetic material mounted in the meter housing 32 immediately behind the needle 35 and in a plane parallel to the plane of movement of said needle. As shown in Figure 3, the plate member 77 is located subjacent the meter scale 36. Mounted on suitable vertical brackets 78 rigidly secured in the housing 32 on opposite sides of the meter coil 34 are respective horizontally extending solenoids 79, 79, and slidably supported on said solenoids for horizontal movement are respective transversely extending horizontal arms 80 connected by a cross bar 81 extending parallel to and adjacent the plate member 77 but being disposed forwardly of the needle 35. As shown in Figure 4, the arms 80 are slidably supported on pins 82 mounted in the side walls of the housing 32 and extending through slots 83 provided in the arms 80. The cross bar 81 is biased forwardly, namely, toward the front wall 38 of housing 32 in any suitable manner, as by a pair of biasing springs 84 connecting the opposite end portions of the cross bar 81 to the wall 38.

Secured on the rear surface of the cross bar 81 is an arcuate felt pad 85 extending parallel to the plate member 77 and being clampingly engageable with the needle 35, responsive to the energization of the solenoids 79, to secure the needle in a fixed position against the plate 77.

Secured to the respective arms 80 are respective inwardly projecting plate members 86 of magnetic material extending inwardly behind the plate member 77 and forwardly adjacent the cores of the respective solenoids 79, whereby the energization of the solenoids causes the arms 86 to be drawn toward the solenoid cores and thus causes cross bar 81 and pad 85 to move toward the plate 77, clamping the meter needle 35 against said plate 77.

The solenoids 79, 79 are connected in parallel to respective wires 87 and 88, as shown in Figure 5, the wire 87 forming part of the cable 13. Mounted in the housing 32 is a battery 89 to the negative terminal of which wire 88 is connected. Connected to the positive terminal of battery 89 is a wire 90, forming part of the cable 13. Cable 13 is provided at its end with a conventional four-prong male plug 91 to the prongs of which the respective conductors 56, 76, 90 and 87 are connected. The mechanical portion 31 of the caliper device is provided with a four-sleeve female socket 92 adapted to receive the four-prong male plug 91. Thus, the socket 92 has the respective sleeves 93, 94, 95 and 96 adapted to receive the respective prongs connected to wires 87, 90, 76 and 56. Sleeve 93 is connected inside the circular housing 17 by a wire 97 to the contact 29 of the relay device 27. Sleeve 94 is similarly connected by a wire 98 to the contact element 28 of said relay device 27. Sleeve 95 is connected to resistor terminal 20 by a wire 94'. Sleeve 96 is connected to the movable resistor contact arm 19 by a wire 100.

Normally, the variable resistor defined by resistance element 18 and contact arm 19 is connected so that when the switch 61 is closed, the variable resistor thus defined will be in series with the meter coil 34 and the battery 55. Also in series in this circuit are the adjusting resistor 57' and a selected one of the resistors $R_{19}$ to $R_{26}$ of the group 46. Thus, for example, assuming the switch arm 50 to be in the position shown in Figure 5, the normal circuit of the meter coil 34 comprises battery 55, wire 56, wire 100, contact arm 19, resistance element 18, wire 94', wire 76, switch arm 72, contact 73, wire 71, meter coil 34, wire 69, contact 64, armature 65, wire 68, the winding of relay 63, wire 67, resistor $R_{19}$, switch arm 50, wire 54, switch 61, resistance contact 59, resistance element 57', and wire 60 connected to the negative terminal of battery 55. Under these conditions, the current in the meter coil 34 will vary in accordance with the adjustment of the contact arm 19 on resistance element 18, namely, in accordance with the separation of the caliper arms 14 and 15. However, the range of the setting of the caliper arms is limited, because of the limited range of the current readings obtained from the milliammeter and because it is desirable to limit the current readings in order to obtain a high degree of accuracy. The range settings of the device are determined by the settings of the range indicating knob 47, namely, by the selection of one of the range resistors $R_{19}$ to $R_{26}$.

The calibration of the device to compensate for changes in voltage of the battery 55 consists essentially of substituting an accurately known value of resistance in a portion of the circuit of the milliammeter in place of the variable portion of the circuit and adjusting the ammeter to a zero reading. The substitution is accomplished by actuating the push button 75 to move switch arm 72 from contact 73 into engagement with contact 74. As will be apparent, the meter coil 34 is connected between the wire 53 at a point X and the switch pole 72. The positive terminal of battery 55 is connected through wires 56 and 57 to a point Y, namely, the wire 52 between switch pole 48 and the resistor group 45. When the switch pole 72 is moved into engagement with the contact 74, the meter is connected in series with a selected resistor of group 44 between the point X and the point Y, this series circuit being supplied with current by the battery 55 between the points X and Y through the adjustable calibrating resistor 57' and a selected resistor of the group 46, the selected resistor being determined by the setting of the common selector knob 47. The resistors $R_3$ to $R_{10}$ are equal to the various values of the variable resistor 18 at respective different inch settings of the caliper arms, namely, spacings of the tips 16 and 17', with the value of $R_3$ equal to the value of the variable resistor 18 at the zero setting, namely, at the engaging position of the caliper arm tips. The value of $R_4$ is thus equal to the value of the variable resistor 18 with the caliper tips spaced apart by one inch, the value of $R_5$ is equal to the value of the variable resistor 18 with the caliper arms spaced apart two inches, etc.

The values of resistors $R_{11}$ through $R_{18}$ in the resistor group 45 are such as to allow the proper amount of current from the series circuit including the selected resistor of the resistor group 46 and the resistance 57' to flow through the network branch containing the milliammeter to give a zero reading of the milliammeter when the variable resistance 57' is properly adjusted by means of the knob 58, with switch arm 72 engaging contact 74.

The resistors $R_{19}$ to $R_{26}$ are of proper values to limit the series current in the circuit branch feeding the network containing the milliammeter coil to limit the current through the coil to values below its maximum rated current value in the respective different settings of the range selecting knob 47.

In using the device, the selector knob 47 may be first set to a value estimated to be less than an inch below the distance to be measured. The operator then actuates the push button 75 and adjusts the knob 58 to establish a zero reading on the meter scale 36. With push button 75 released, the caliper tips 17' and 16 may be extended to the selected setting indicated by knob 47 without any movement of the meter needle 35. As the tips 16 and 17' are spread beyond the selected distance, the resistance defined between terminal 20 and contact arm 19 decreases sufficiently to allow substantial current to flow in the meter coil 34, giving a reading on the meter scale corresponding to the distance value over and above that indicated by the knob 47, so that the spacing between the caliper tips may be found by adding the indicated reading on the meter scale 36 to the setting of the knob 47.

The scale 36 may be calibrated in suitable fractional inch values, such as in values of 100th of an inch.

A second method of use of the device employs the meter protecting relay 63. In this method the caliper tips are extended first, regardless of the setting of the selector knob 47, for an inside or outside measurement, as required. The movable caliper arm 15 is then locked by means of the clamping screw 25. As the relay 63 responds to current exceeding full scale value through the meter coil 34, the armature 65 engages contact 66 as the tips 16 and 17' are extended approximately one inch beyond the setting of the selector knob 47, shunting the excessive current into the circuit of the resistor group 44 and disconnecting the meter coil 34 from the circuit. The selector knob 47 is then rotated either to increase or decrease the said value thereof until a meter movement is noted, inasmuch as relay 63 will release when the setting of the knob 47 is at a position approximately one inch less than the spacing between the caliper tips 16 and 17'. The push button 75 is then actuated and the knob 58 is then adjusted to provide a zero setting on the meter scale. When the button 75 is released, the needle 35 will then swing to provide a reading on the meter scale which is added to the setting of the selector knob 47 to provide the distance between the caliper tips.

As above pointed out, the meter needle 35 may be locked in any position thereof by energizing the solenoids 79, 79. The needle may be locked at any time it is desired to store a meter reading. For example, assume that a mechanic is required to measure the inside of a cylinder wall. The selector knob 47 is set at a position corresponding to a value estimated to be one inch less than the expected measurement. The push button 75 is actuated and knob 58 is adjusted to provide a zero reading on the meter, after which push button 75 is released. The meter housing may be left a substantial distance away from the work to be measured while the mechanic inserts the mechanical portion of the device into the cylinder and extends the tips 16 and 17' to engage opposite points of the inside wall surface of the cylinder. The mechanic actuates the push button switch 30 located on the supporting track 31, closing the contacts 28 and 29 of the relay device 27, and thus energizing the solenoids 79, 79, whereby the meter needle is locked. The caliper legs can then be closed and withdrawn from the cylinder and the measurement can be noted, the measurement comprising the meter reading plus the setting of the selector knob 47. The meter needle can be thereafter released by again actuating the push button switch 30.

The caliper arms 14 and 15 may be spread apart by the use of the actuating knob 23, or alternatively may be spread apart manually, since the pinion gear 22 is in meshing engagement with the teeth of the arcuate rack member 21 and can rotate freely along the arcuate rack member 21 when the arms 15 and 16 are spread apart manually.

Obviously, by disconnecting the male plug 91 from the socket 92, the mechanical portion of the device may be employed independently in the manner of conventional calipers.

While a specific embodiment of an improved electrical caliper device has been disclosed by the foregoing description, it will be understood that various modifications within the spirit of the invention may occur to those skilled in the art. Therefore, it is intended that no limitations be placed on the invention except as defined by the scope of the appended claim.

What is claimed is:

In a caliper, a pair of work-engaging arms, means pivotally connecting said arms together for relative rotation around a common axis, a variable resistance mounted on said arms and controlled in value in accordance with the separation of the free ends of said arms, a main measuring circuit comprising a first variable calibrating resistor, a source of current, and said variable resistance connected in series, second and third variable calibrating resistors ganged with said first variable calibrating resistor, said third variable calibrating resistor having settings of known value corresponding to the values of said first-named variable resistance at known separations of the free ends of said arms, means connecting said second variable calibrating resistor across the series circuit comprising said first calibrating resistor and said source of current, an indicating circuit, means formed and arranged to normally connect said indicating circuit in series with said main measuring circuit, and means formed and arranged to disconnect said first-named variable resistance from said main measuring circuit and to connect said third variable calibrating resistor into the main measuring circuit in place thereof.

References Cited in the file of this patent

UNITED STATES PATENTS

| | | |
|---|---|---|
| 1,873,983 | Sieber | Aug. 30, 1932 |
| 1,972,759 | Burnette | Sept. 4, 1934 |
| 2,198,523 | Adams | Apr. 23, 1940 |
| 2,497,990 | Huber et al. | Feb. 21, 1950 |
| 2,580,717 | Ballou | Jan. 1, 1952 |
| 2,581,219 | Thorburn | Jan. 1, 1952 |
| 2,654,054 | Morelock | Sept. 29, 1953 |
| 2,697,203 | Shepard | Dec. 14, 1954 |
| 2,820,297 | Anderson | Jan. 21, 1958 |